United States Patent [19]
Fantenberg

[11] Patent Number: 6,061,685
[45] Date of Patent: *May 9, 2000

[54] SYSTEM AND METHOD FOR PROVIDING A MANAGING SYSTEM THAT MANAGES A NUMBER OF MANAGED SYSTEMS WITH INFORMATION THAT IS UP-TO-DATE

[75] Inventor: Johan Fantenberg, Melbourne, Australia

[73] Assignee: Telefonaktiebolaget LM Ericsson, Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/836,895

[22] PCT Filed: Nov. 22, 1995

[86] PCT No.: PCT/SE95/01388

§ 371 Date: Jul. 28, 1997

§ 102(e) Date: Jul. 28, 1997

[87] PCT Pub. No.: WO96/16502

PCT Pub. Date: May 30, 1996

[30] Foreign Application Priority Data

Nov. 23, 1994 [SE] Sweden .................................. 9404054

[51] Int. Cl.[7] ........................... G06F 17/30; G06F 15/173
[52] U.S. Cl. ................................ 707/10; 707/9; 707/203; 707/204; 711/118; 395/200.31; 395/200.38; 395/200.47
[58] Field of Search ............................ 707/10, 100, 201, 707/203, 9, 204; 395/200.31, 200.38, 200.47, 200.53; 711/118

[56] References Cited

U.S. PATENT DOCUMENTS 4,714,992  12/1987  Gladney et al. ........................ 707/206
4,972,367  11/1990  Burke ....................................... 707/10
5,136,707   8/1992  Block et al. ............................ 707/201
5,418,945   5/1995  Carter et al. ............................. 707/8
5,546,574   8/1996  Grosskopf et al. .................... 707/201
5,586,310  12/1996  Sharman ................................ 707/10
5,602,991   2/1997  Berteau ........................... 395/200.57
5,623,669   4/1997  Kincaid ................................ 707/205
5,671,408   9/1997  McBride ............................... 707/100
5,737,738   4/1998  Sharman ............................... 707/201

FOREIGN PATENT DOCUMENTS 585 082       3/1994    European Pat. Off. .
618 712      10/1994    European Pat. Off. .
621 706      10/1994    European Pat. Off. .
WO93/18598    9/1993    WIPO .

OTHER PUBLICATIONS

CCITT Recommendation M.3010, "Principles for a Communications Management Network" (Oct. 1992).

European Telecommunication Standard 300 613, "Digital cellular telecommunications system (Phase 2); Subscriber, Mobile Equipment (ME) and services data administration GSM 12.02" (Jun. 1996).

*Primary Examiner*—Jean R. Homere
*Attorney, Agent, or Firm*—Burns, Doane, Swecker & Mathis, L.L.P.

[57] ABSTRACT

A system and a method respectively for providing a managing system which manages a number of managed systems, with desired and up-dated information. At least one information storing device is arranged which is provided with the original information which is relevant to the managed system(s), which information storing device is up-graded. The managing system includes a device for fetching information from one of the information storing devices and the fetched information is held in information holding devices including a cache arranged in the managing system.

23 Claims, 3 Drawing Sheets

SYSTEM AND METHOD FOR PROVIDING A MANAGING SYSTEM THAT MANAGES A NUMBER OF MANAGED SYSTEMS WITH INFORMATION THAT IS UP-TO-DATE

BACKGROUND

The present invention relates to a system for providing a managing system which manages a number of managed systems with information. The invention also relates to a managing system which is provided with information. The invention further relates to a method for providing a managing system managing a number of managed systems with information. Still further the invention relates to a telecommunications system comprising a number of managing systems each managing a number of managed systems in which the managing systems are provided with information.

Generally the amount of information relating to most managed systems is very high and complex to handle in ain optimum way both because of the amount and because of the difficulty in getting access to the information that is really accurate, i.e. information that is correct for the purpose, up-to-date and for example comprises the particular version or revision etc. that is actually needed. Thus in systems known tcday, the provision of the particular piece of information that is needed is a difficult issue both because of the amount of information and because the information is not time-invariant, i.e. it is up-dated, changed etc.

Mostly, therefore, various tools are needied to enable the provision of information and support the user interaction with various managed systems.

In a number of systems which are known today managed systems comprise so called network elements which comprise various services and/or resources wherein in the network elements are comprised in a telecommunications network. The network comprises a considerable amount of various types of equipment but also a high number of various services may be comprised. Furthermore equipment of one and the same type may be provided in a number of different versions and revisions. Thus the different services and resources which are provided in the network element may be very complex for a user to handle, monitor and control. The information as such may comprise substantially all kinds of information that is needed by the user who interacts with the managed system, particularly it may describe usage, limitations, procedures, error-print-outs and so on.

The managing system, in the known embodiment referred to as operations system, which here is used to monitor and control the equipment and the services provided by the network elements must know what information is related to a given piece of equipment or to a service. The operations system must also be informed on possible changes to the equipment and the services. This requires that new information is made available to the operations systems. This is both complicated and complex and it gets more difficult the higher the number of equipment and services existing. In order to facilitate the user interaction with the network elements it is known from the known system to provide graphical tools for the user interface. However, even if the user interface is explanatory and the user interaction is facilitated, it is also important that the information is correct and up-to-date.

This puts requirements on a correlation of the information with the concept described by the information. A further complicating factor is that the operations system sometimes exist in a multilingual environment.

In order to provide an up-to-date information the information is in the known system manually transferred to the operation systems. This gets very complex since it is necessary to maintain knowledge of which operations systems are used for managing a particular set of equipment and/or services. Furthermore, when new equipment or new services are introduced in the network elements, it may be necessary to introduce new information to the operations systems which is time consuming in a complex environment. The more complex the environment, the more time it takes. During the time spent on introducing this new information to the operations systems, the operations systems still work with the old piece of information relating to the concerned equipment or the concerned services which in turn may lead to improper actions being taken by the operator.

It is an object of the present invention to p:rovide a system for providing a managing system with accurate, correct and up-to-date information in a reliable way and in a way which is not demanding for a user. Particularly it is an object of the invention to provide a system and a method for providing a managing system with an up-dated and correct view of the documentation and information on facilities such as equipment, services etc. that exist in a communications system or a communication network in which the managed system or systems are arranged.

Another object of the invention is to provide a system and a method for facilitating monitoring and controlling of managed systems which are managed by the managing system. It is also an object to provide a managing system with information in order to facilitate user interaction with system managed by the managing system. Particularly it is an object of the present invention to provide a system and a method respectively through which it is not necessary to introduce new information to a managing system when systems managed by said managing system are provided with new information, up-graded etc. i.e. to provide for the managing system not having to be up-graded. Particularly it is an object of the present invention to provide a s;ystem and a method respectively which fulfils the above mentioned requirements also when the amount of information, in particularly relating to various versions, revisions etc of equipments and services and so on provided by managed system, is high.

Still a further object is to correlate the information with information relating to the concept described by the information. Yet another object is to provide a system and a method through hich can be avoided the necessity of maintaining knowledge of which managing system manages a given managed system related to e.g. a given set of equipment or services etc.

In a particular embodiment it is an object of the invention to provide a system and a method for providing an operation system, managing a number of network elements in an efficient, correct and up-dated manner, with the information relating to the network elements managed by the operation system without having to up-grade the operations system itself when the services or equipments of the network elements are changed, up-dated, having been removed, added etc.

Moreover it is an object of the present invention to provide for the provision of a managing system, in a particular case an operations system, with the correct and up-to-date information which is related to a given piece of information such as services, equipment etc.

It is also an object of the present invention to provide a telecommunications system comprising a number of managing systems which manage a number of managed systems wherein the managed systems are provided with accurate, correct and up-to-date information without having to up-grade the managing systems when new information is introduced or when the information relating to services, equipments etc. are changed in one way or another.

These as well as other objects are achieved through a system and a method respectively which comprises at least one information storing means which is provided with original information documentation relevant to the managed systems managed by the managing system wherein said information storing means are up-graded and wherein the managing system comprises means for fetching information from one of the information storing means and wherein the managing system further comprises a cache for holding the information that has been fetched from the information storing means.

Particularly a managing system is provided with on-line documentation which e.g. is stored in information storing means e.g. of a managed system. The information storing means is upgraded.

Through a telecommunications system the objects are achieved through the provision of information storing means which are up-graded when information is added, removed or changed in one way or another wherein each managing system comprises fetching means for fetching information from the information storing means and wherein the managing systems also comprises information holding means comprising a cache for holding the information that has been fetched from the information storing means.

It is an advantage of the invention that the managing system always has an up-to-date and correct view of the documentation of and information about facilities such as equipments, services etc. related to the managed systems. It is also an advantage that through the invention a system or particularly a telecommunications system is provided wherein the user interaction with the managed systems is facilitated. A further advantage is that the information that is needed does not have to be manually transferred to the managing systems and that no time is lost for introducing new information into the managing systems themselves, i.e. to up-grade them which prevents the user or the operator in a communication system etc. from taking improper actions.

It is also an advantage of the invention that the user knows that the documentation or the information that he is provided with is the correct documentation or information with respect to version, revision etc.

Still another advantage of the invention is that, since the managing systems do not have to be up-graded, the need for coordination of the overall system is considerably reduced.

BRIEF DESCRIPTION OF THE DRAWINGS

The invention will in the following be further- described in a non-limiting way under reference to the accompanying drawings, in which:

In FIG. 1 is schematically illustrated a managing system 1 which fetches information from a managed system 2 which is managed thereby. The managing system 1 comprises in the shown embodiment a number a management stations MNS 6. In the embodiment illustrated in this figure, management stations i are illustrated as being comprised by the managing system 1 but they may likewise be illustrated as not forming part of the managing system 1. The managing system 1 as such can be a stand-alone system but it can also form a distributed system. The managing system 1 further comprises as an information holding means 4 a cache or an information cache for holding information which has been fetched from an information storing means 3 which will be further explained below. The cache 4 is managed by a cache manager 5. The cache 4 may further be shared in a LAN/WAN (Local Area Network/Wide Area Network) environment according to one embodiment although it is not necessary; a number of other alternatives naturally also being possible. A managing system generally comprises means in the form of hardware and software which is used for monitoring and controlling a number of managed systems, in the shown schematical embodiment however but one managed system 2. This is however so merely for illustrative purposes. The monitoring and controlling is sometimes generally exclusively carried out by software without any human intervention but in other cases human intervention is required. The user is then assisted by use of interactive software and documentation and the managing system provides the necessary functions.

Figure 1:
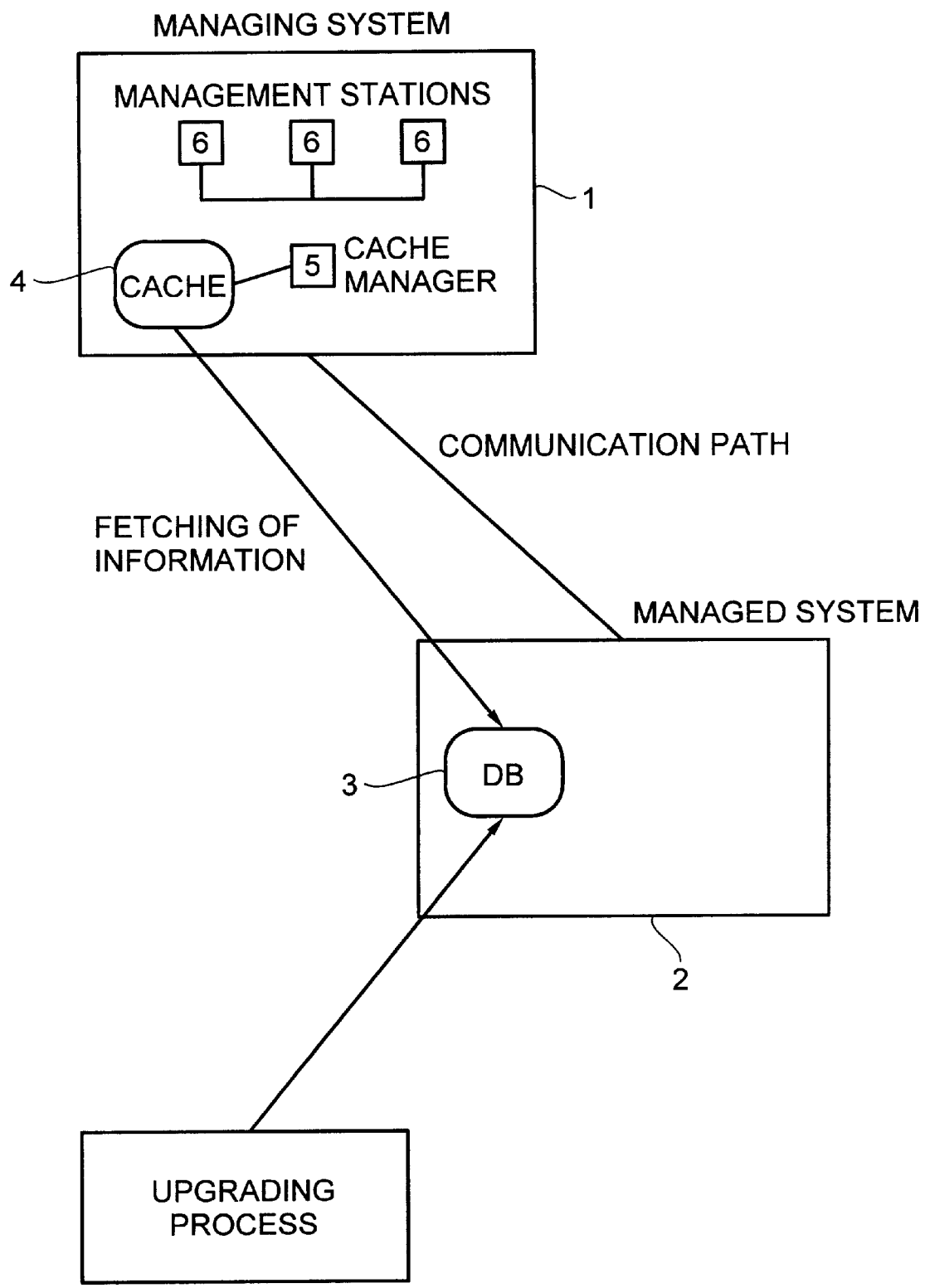
FIG. 1 illustrates a managing system bein(g provided with information.

The managed system 2 here comprises a logical database or an information database which holds the original or basic information. The logical database can be of many different kinds, e.g. a relational database, an object database or it may comprise a file system. A number of other alternatives are also possible. The kind of media and the format is not of importance for the present invention. Information is introduced in the logical database during an up-grading process. The information is "delivered" together with the software/hardware being described by the information. The logical database DB 3 as such may either be arranged in the means providing telecommunication services etc. or it may be implemented in a distributed environment (see FIG. 2). The computer hosting the logical database DB can be used exclusively by one telecommunications system but it can also be shared by a number of telecommunications systems. The information of the logical database 3 can exist in a number of different versions and/or revisions and also for example be provided in a number of different languages. The managed system 2 comprises both hardware and software and it provides services or functions e.g. in a telecommunications network.

In the following the provision of the managing system 1 with information will be described in relation to FIG. 1; it is however generally relevant also to FIGS. 2 and 3.

When a management association is to be established (or when a managed system 2 is activated) the managing system 1 checks if the information contained in the cache 4 is relevant, i.e. if it is correct and up-to-date. This may according to an advantageous embodiment be carried out in such a way that the information of the cache 4 is compared to information of the information storing means DB 3. If the information in the cache 4 is the same as the information in the information storing means 3 or the logical database DB of a managed system 2, then the information of the cache 4 is the wanted information and the information in the cache 4 is used. If on the other hand the information in the cache 4 is not the same as the information in the information storing means DB 3, then the information needs to be fetched from the information storing means 3. This can be done in different ways.

According to a first embodiment, the information is always fetched from the managed system 2. Advantageously the fetching process does not block other running processes. Then the managing system may send and receive management operations and notifications in the meantime when other processes, which might be blocked by the fetching process, are not running.

According to a further embodiment the information is fetched from the managed system 2 when needed, i.e. when some information is requested and is not found in the cache 4 then it is fetched from the information storing means 3 (DB).

According to still another embodiment the information may be preinstalled in the cache 4 which reduces heavy first time loadings of the cache 4.

The manner in which the desired information is fetched can be done according to needs and system, depending on which characteristics that are wanted etc.

The fetching operation can be carried out by use of a file transfer protocol or through a distributed fileid system or in any other convenient way.

After the information has been fetched it is installed in the cache 4. Then it can be accessed by a usger or the tools supporting a user. The information in the cache 4 is maintained by the cache manager 5. The information storing means 3 (DB) comprise master information which as referred to above e.g. may be stored as files. Of course it can also be stored in a number of other ways which are known per se since the storing media and format is not important for the present invention as referred to above.

In another advantageous embodiment the managing system 1 may, when a management association is to be established, select where the original information or the information is to be fetched from. The information can be fetched from the actual managed system 2 (as illustrated in FIG. 1) but it can also be fetched from some other information storing means or seicond information storing means 3" (FIG. 2) providing the information. In such an embodiment the information is duplicated within a network. This may e.g. be done in order to reduce the costs of access or to increase the robustness e.g. through allowing duplication. Thus also other information storing means, under reference to FIG. 2 referred to as second information storing means, may be up-graded parallell with the information storing means 3;3' and it is the up-grading process which is responsible for the: distribution of the information within the network or within the system.

Thus according to one embodiment a cache manager 5 may fetch the information from the managed system if necessary and from secondary sources 3" if the managed system 1 can. not be accessed or if it is better in one way or another to fetch it from another or a secondary source, e.g. if it is cost reducing.

Advantageously the cache manager 5 as a rule checks in the cache 4 to see if it necessary to fetch any information and the cache 4 may be preloaded, built up in parallel during the management session or built up as needed as referred to above.

In FIG. 1 a communication path between the managing system 1 and the managed system 2 is illustrated. Corresponcing communications are not illustrated in FIGS. 2 and 3 for reasons of clarity.

Figure 2:
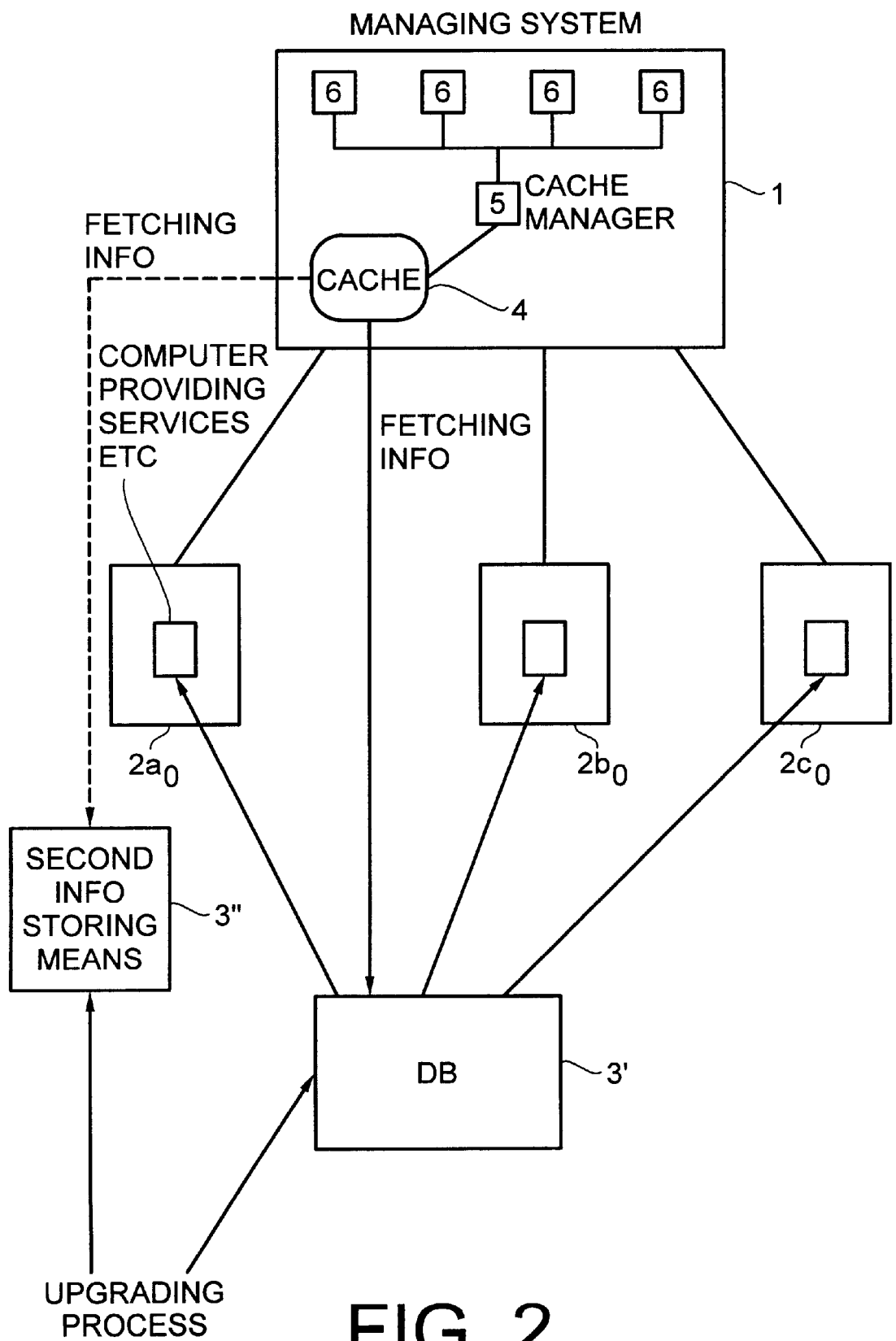
FIG. 2 illustrates one example of a managing system managing three managed systems and FIG. 3 schematically illustrates a telecommunications managing network comprising a number of managing systems.

In FIG. 2 one embodiment is schematically illustrated wherein in a managing system 1 manages three managed systems 2a, 2b, 2c. The managing system 1 comprises a number of management stations MNS 6, a cache manager 5 and a cache 4 as described in the foregoing. The information storing means (DB) 3' is implemented in a distributed environment and is shared by a number of managed systems 2a, 2b, 2c in which each is illustrated a computer providing services or similar. The system also comprises a second information storing means 3". The information in the information storing means 3' is duplicated and the up-grading process is up-grading both the information storing means 3' and the second information storing means 3". The managing system 1 selects if the information is to be fetched from the information storing means 3' (DB) or from the second information storing means 3" as already discussed above.

Figure 3:
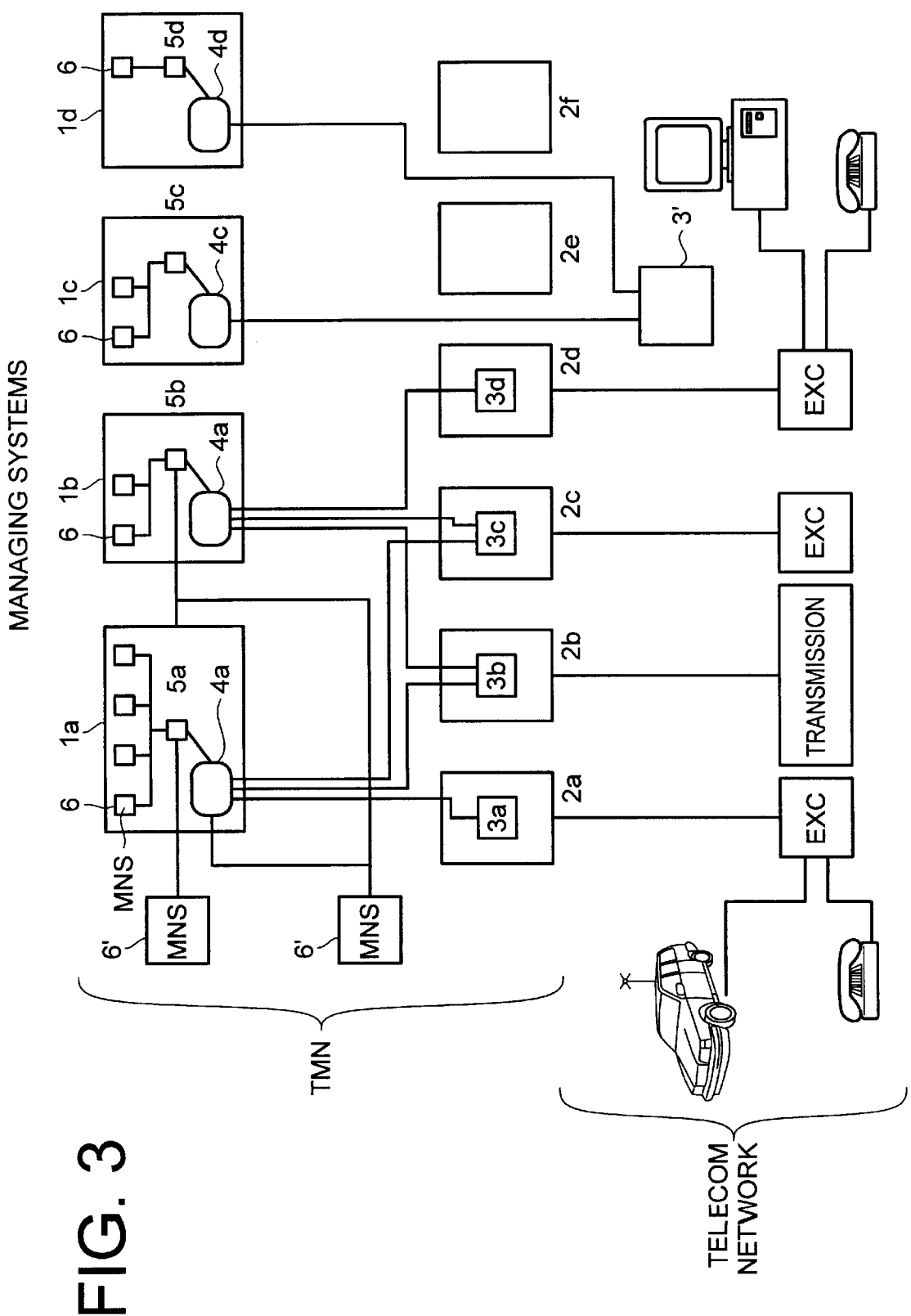

FIG. 3 illustrates an embodiment comprising a number of managing systems 1a, 1b, 1c, 1d each managing a number of managed systems 2a, 2b, 2c; 3b, 3c, 3d; 2e; 2f and of which somea managed systems comprise an information storing means (logical database) in the actual managed system 2a, 2b, 2c, 2d whereas for other managed systems 2e, 2f the actual information storing means 3' is implemented in a distributed environment as discussed above in relation to FIG. 2. Management stations 6 are both comprised by the managing systems but also arranged "independently" 6'.

In one particular embodiment which also is illustrated by FIG. 3 even if this Fig not exclusively describes this embodiment, the managing systems comprise so called operations systems and the managed systems comprise so called network elements and a so called telecommunications management network TMN provides management functions and offers communications as well between different operations systems as between operations systems and other parts of a telecommunications network. The network elements may comprise switching systems, exchanges EXC, transmission systems etc. The invention can also be implemented in a telecommunications management network TMN, as defined in CCITT Recommendations M.3010 in which it can be said to be formed of a separate network which interfaces a telecommunications network at a number of different points for sending/recEaiving information to and/or from it and for controlling its operations. Particularly parts of the telecommunications network may be used by the TMN for the provision of its communications. FIG. 3, as referred to above, in one aspect illustrates the application of the invention to the telecommunication managing network TMN concept.

A telecommunications management network may e.g. at the lowest level relate to a connection between an operations system and a network element, but it may also relate to e.g. a whole network of operations systems controlling a large telecommunications network or anything therebetween. An operator interface denoted Q3 has been standardized for a telecommunications system providing the connection between managing and managed systems. In the recommendations relating to the GSM Standard (Global System for Mobile Communications) subscriber administration is defined in the GSM Technical Specifications TS 12.02. According thereto the Q3 operator interface is specified for the provision of the subscriber administration functionality. The Q3 interface defines both the object oriented information model of so called network elements and the communication protocol between the so called operations systems and the networks elements. In the CCITT Recommendation No M.3010 a network element function block is defined as a functional block communicating with the telecommunications management network TMN (for the purpose of being monitored and/or controlled). The network element function block provides the telecommunications and support functions which are required by the telecommunications network that is managed. It comprises the telecommunications functions which are the subject of management. The functions as such are not part of the TMN but they are represented to the TMN by the network element function block. The part of the network element function block that provides this representation in support of the TMN is part of the TMN itself whereas the telecommunications functions are outside the telecommunications management network. Furthermore an operations systems function block is defined as processing the information that is related to the telecommunications management for the purpose of monitoring/coordinating and/or controlling telecommunication functions including management functions.

This however merely relates to one embodiment, or one aspect of, the present invention.

In still other embodiments the principle of the invention applies to managing systems being managed by other managing systems on the same or on a higher logical level and the same principle applies for providing this higher level (or superior) managing systems with information.

Still further the principle of the invention applies to a managed system managing a hierarchically seen lower managed system or a subordinate system. Consequently the invention can be varied in a number of ways and it shall not be limitE.d to the shown embodiments but merely by the scope of the claims.

What is claimed is:

1. A system for providing a managing system in a communications network, wherein said managing system manages a number of managed systems, with information which is up-to-date, comprising:
   at least one information storing means associated with the managed system and which is provided with original information relevant to the managed system, wherein the information storing means are upgraded;
   means associated with the managing system, for fetching information from one of the information storing means;
   a cache associated with the managing system for holding the information fetched from an information storing means, wherein original information of each managed system is stored in at least one logical database, and the original information and upgraded information are stored in a number of second storing means, each comprising a logical database copy and information relevant to at least one managed system, and wherein the managing system can fetch information from either the first storing means or the second storing means; and
   wherein the managing system comprises information access means for checking if the information is valid by comparing information in the cache with information stored in the storing means, and if the information in the cache is the same as the information in the information storing means, then the information in the cache is used, and if the information in the cache and the information in the information storing means is not the same, then the information in the information storing means is fetched.

2. The system of claim 1, wherein each information storing means is a logical database.

3. The system of claim 2, wherein the logical database comprises at least one of a relational database, an object database and a file system.

4. The system of claim 2, wherein each managed system comprises information storing means in form of a logical database.

5. The system of claim 2, wherein one logical database is common for a number of managed systems.

6. The system of claim 1, wherein upgraded information is duplicated and stored in a number of second storing means, and the managing system selects where to fetch the information from.

7. The system of claim 1, wherein the managing system comprises a cache manager for managing the cache.

8. the system of claim 1, wherein the managed system comprises at least one management station comprising a user interface.

9. The system of claim 1, wherein the information storing means comprises information which is provided in different versions and different revisions.

10. The system of claim 9, wherein the information is provided in a number of different languages.

11. The system of claim 1, wherein information is always fetched from at least one of an information holding means and an information storing means when a managed system is activated.

12. The system of claim 1, wherein the cache is preloaded.

13. The system of claim 1, wherein information is fetched from an information storing means when needed.

14. The system of claim 1, wherein the fetching means comprises a file transfer protocol.

15. The system of claim 1, wherein the fetching means comprises at least one of a distributed file system and a distribution mechanism.

16. The system of claim 1, wherein the managing system controls and/or monitors a number of managed systems.

17. The system of claim 1, wherein the managing system is a telecommunications operation and support system.

18. The system of claim 1, wherein a managed system is a network element.

19. The system of claim 18, wherein the managed system comprises at least one of a transmission system, a switching system, and a signaling terminal.

20. The system of claim 1, wherein the managing system is a stand-alone system.

21. The system of claim 1, wherein the managing system is a distributed system.

22. The system of claim 1, wherein a managed system forms a managing system for a number of secondary managed systems on a lower hierarchical level.

23. A method for providing a managing system in a communications network with up-to-date information, wherein at least a number of managed systems are managed by the managing system, comprising the steps of:
   providing information storing means associated with a managed system with original information, and upgrading the information storing means by an upgrading process, wherein
   the managing system fetches information from the information storing means, and
   the information is held in a cache of the managing system, and wherein
   original information of each managed system is stored in at least one logical database, and
   the original information and upgraded information are stored in a number of second storing means, each comprising a logical database copy and information relevant to at least one managed system, and wherein the managing system can fetch information from either the first storing means or the second storing means; and
   wherein the managing system comprises information access means for checking if the information in the cache is valid by comparing information in the cache with information stored in the storing means, and if the information in the cache is the same as the information in the information storing means, then the information in the cache is used, and if the information in the cache and the information in the information storing means is not the same, then the information in the information storing means is fetched.

* * * * *